(12) United States Patent
Williams

(10) Patent No.: US 9,081,582 B2
(45) Date of Patent: Jul. 14, 2015

(54) MICROCODE FOR TRANSPORT TRIGGERED ARCHITECTURE CENTRAL PROCESSING UNITS

(75) Inventor: Albert A. Williams, League City, TX (US)

(73) Assignee: THE BOEING COMPANY, Chicago, IL (US)

( * ) Notice: Subject to any disclaimer, the term of this patent is extended or adjusted under 35 U.S.C. 154(b) by 935 days.

(21) Appl. No.: 12/887,125

(22) Filed: Sep. 21, 2010

(65) Prior Publication Data

US 2012/0072706 A1    Mar. 22, 2012

(51) Int. Cl.
| | | |
|---|---|---|
| G06F 7/38 | (2006.01) | |
| G06F 9/00 | (2006.01) | |
| G06F 9/44 | (2006.01) | |
| G06F 15/00 | (2006.01) | |
| G06F 9/38 | (2006.01) | |
| G06F 9/30 | (2006.01) | |

(52) U.S. Cl.
CPC .......... *G06F 9/3885* (2013.01); *G06F 9/30145* (2013.01)

(58) Field of Classification Search
None
See application file for complete search history.

(56) References Cited

U.S. PATENT DOCUMENTS

| 4,027,293 A | 5/1977 | Lincoln et al. |
| 4,459,666 A | 7/1984 | Kruger |
| 6,957,322 B1 | 10/2005 | Pickett |

OTHER PUBLICATIONS

PCT Search report dated Oct. 26, 2011 regarding Application No. PCT/US2011/047344.
Corporaal et al., "MOVE32INT, a Sea of Gates realization of a high performance Transport Triggered Architecture," Microprocessing and Microprogramming, vol. 38, Nos. 1/5, Sep. 1993, pp. 53-60.
Heikkinen et al., "Dictionary-Based Program Compression on TTAs: Effects on Area and Power Consumption," IEEE Workshop on Signal Processing Systems Design and Implementation, Nov. 2005, pp. 479-484.
Hu et al., "Pre-synthesis resource generation and estimation for transport-triggered architecture (TTA)-like architecture," ScienceDirect, Microprocessors and Microsystems, vol. 32, Issue 4, Jun. 2008, pp. 234-242.
Kulkarni et al., "Micro-Coded Datapaths: Populating the Space Between Finite State Machine and Processor," International Conference on Field Programmable Logic and Applications, Aug. 2006, pp. 1-6.

*Primary Examiner* — Corey S Faherty
(74) *Attorney, Agent, or Firm* — Yee & Associates, P.C.

(57) ABSTRACT

The different advantageous embodiments provide an apparatus comprising a central processing unit, a microcode store, and a number of functional units. The central processing unit utilizes transport triggered architecture and is configured to execute microcoded instructions that allow a single instruction to be executed as multiple instructions. The microcode store includes a number of microcoded instruction implementations. The number of functional units includes a number of useful entry points into the microcode store.

17 Claims, 4 Drawing Sheets

MICROCODE FOR TRANSPORT TRIGGERED ARCHITECTURE CENTRAL PROCESSING UNITS

BACKGROUND INFORMATION

1. Field

The present disclosure relates generally to central processing units and more particularly to transport triggered architecture central processing units. Still more particularly, the present disclosure relates to a system and method for utilizing microcode to create operations for transport triggered architecture central processing units.

2. Background

In a traditional central processing unit (CPU), high level instructions are decoded and execute microcoded instructions to perform operations. This is typical of both Reduced Instruction Set Computers (RISC) and Complex Instruction Set Computers (CISC). These microcode programs orchestrate the transfer of data from one CPU resource to another CPU resource in sequence. However, traditional RISC and CISC CPUs are difficult to modify or augment and are not well-suited for reconfigurable computing because it is difficult to modify the architecture of the CPU arbitrarily. Where simplified modification or reconfiguration is desired, a transport triggered architecture is one possible solution. The transport triggered architecture instruction set is virtually like microcode being exposed to the programmer level. However, this means that some complex operations will require multiple instructions.

Some CPUs with transport triggered architecture will rely on a compiler to expand pseudo operations into complex sequences or call subroutines. On a transport triggered architecture processor, calling a subroutine is often a multiple cycle operation in and of itself. Another option is to have the compiler expand a single macro instruction to a sequence of instructions, which requires large amounts of program space usage.

Therefore, it would be advantageous to have a method and apparatus that addresses one or more of the issues discussed above.

SUMMARY

The different advantageous embodiments provide an apparatus comprising a central processing unit, a microcode store, and a number of functional units. The central processing unit utilizes transport triggered architecture and is configured to execute microcoded instructions that allow a single instruction to be executed as multiple instructions. The microcode store includes a number of microcoded instructions. The number of functional units includes a number of useful entry points into the microcode store.

The different advantageous embodiments further provide a method for using microcoded instructions in a transport triggered architecture central processing unit. A microcoded instruction is loaded from a program. A useful entry point address of a microcoded instruction implementation in a microcode store is transferred to a program counter of a central processing unit. The microcoded instruction implementation is loaded from the microcode store using the useful entry point address. A determination is made as to whether the instruction type of the microcoded instruction implementation loaded from the microcode store is a return, non-microcoded, or microcoded type instruction.

The different advantageous embodiments further provide a reconfigurable system in a transport triggered architecture comprising an integrated nonvolatile microcode store, a number of functional modules, and a control module. The integrated nonvolatile microcode store includes a number of microcoded instruction implementations. The number of functional modules provides a number of useful entry points into the microcode store and further comprise a program counter. The control module is configured to load the number of microcoded instruction implementations from the integrated nonvolatile microcode store into the program counter of the number of functional modules.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
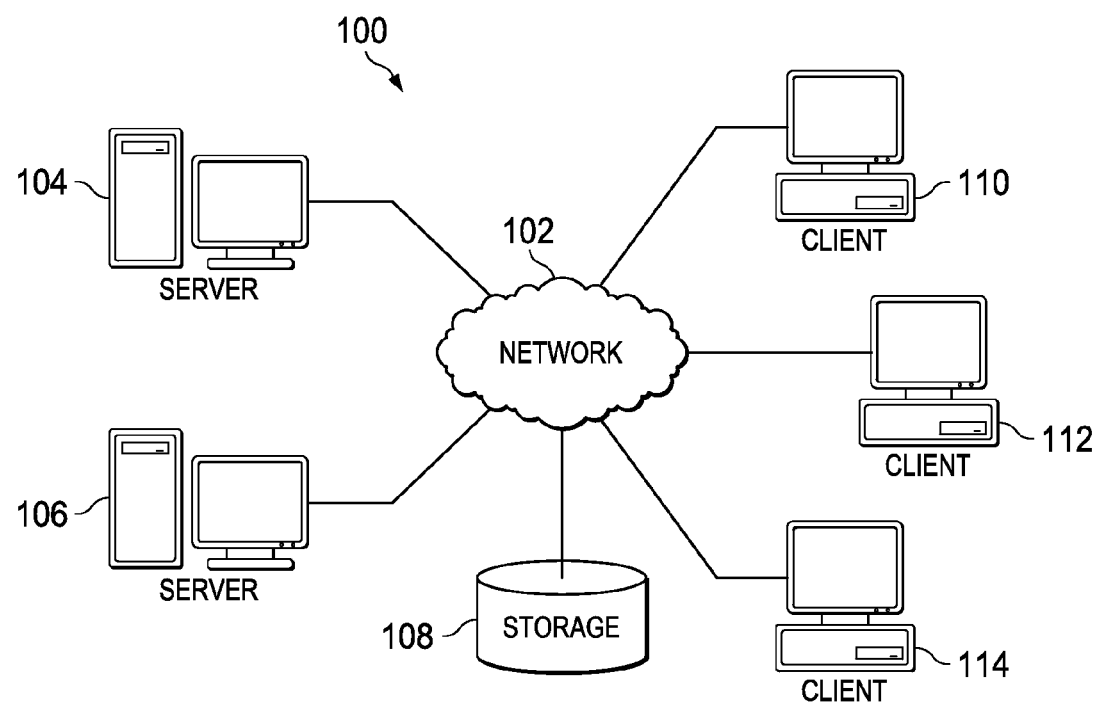
FIG. 1 is an illustration of a network of data processing systems in which an advantageous embodiment may be implemented.
Figure 2:
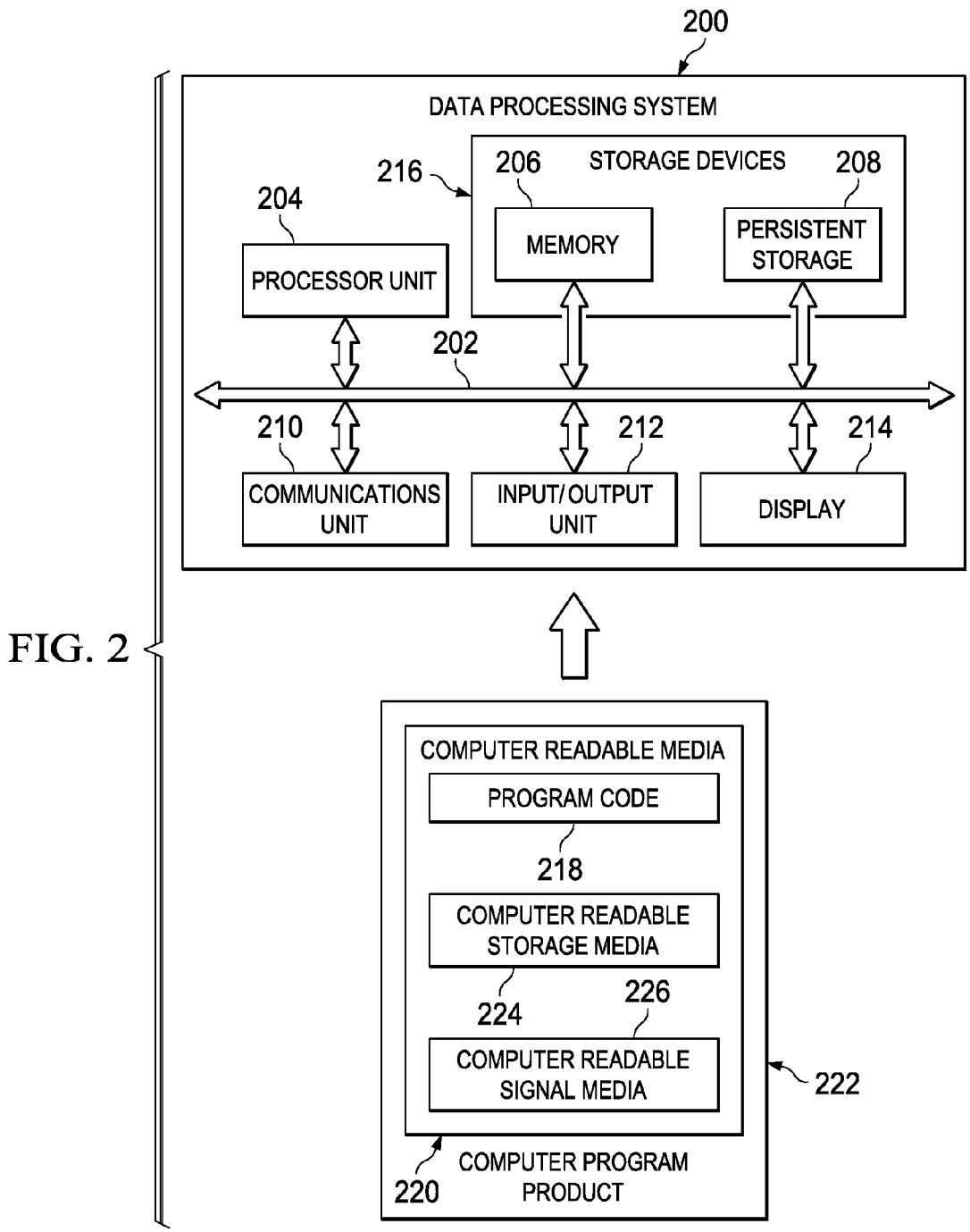
FIG. 2 is an illustration of a data processing system in accordance with an advantageous embodiment.

With reference now to the figures and in particular with reference to FIGS. 1-2, diagrams of data processing environments are provided in which the advantageous embodiments of the present invention may be implemented. It should be appreciated that FIGS. 1-2 are only illustrative and are not intended to assert or imply any limitation with regard to the environments in which different embodiments may be implemented. Many modifications to the depicted environments may be made.

With reference now to the figures and in particular with reference to FIG. 1, an illustrative diagram of a data processing environment is provided in which illustrative embodiments may be implemented. It should be appreciated that FIG. 1 is only provided as an illustration of one implementation and is not intended to imply any limitation with regard to the environments in which different embodiments may be implemented. Many modifications to the depicted environment may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computers 110, 112, and 114 connect to network 102. Client computers 110, 112, and 114 may be, for example, personal computers or network computers. In the depicted example, server computer 104 provides information, such as boot files, operating system images, and applications to client computers 110, 112, and 114. Client computers 110, 112, and 114 are clients to server computer 104 in this example. Network data processing system 100 may include additional server computers, client computers, and other devices not shown.

Program code located in network data processing system 100 may be stored on a computer recordable storage medium and downloaded to a data processing system or other device for use. For example, program code may be stored on a computer recordable storage medium on server computer 104 and downloaded to client computer 110 over network 102 for use on client computer 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

Turning now to FIG. 2, an illustration of a data processing system is depicted in accordance with an advantageous embodiment. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a number of processors, a multi-processor core, or some other type of processor, depending on the particular implementation. A number, as used herein with reference to an item, means one or more items. Further, processor unit 204 may be implemented using a number of heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Storage devices 216 may also be referred to as computer readable storage devices in these examples. Memory 206, in these examples, may be, for example, a random access memory or any other suitable volatile or non-volatile storage device. Persistent storage 208 may take various forms, depending on the particular implementation.

For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or computer readable storage media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be computer readable storage media 224 or computer readable signal media 226. Computer readable storage media 224 may include, for example, an optical or magnetic disk that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory, that is connected to data processing system 200. In some instances, computer readable storage media 224 may not be removable from data processing system 200. In these illustrative examples, computer readable storage media 224 is a non-transitory computer readable storage medium.

Alternatively, program code 218 may be transferred to data processing system 200 using computer readable signal media 226. Computer readable signal media 226 may be, for example, a propagated data signal containing program code 218. For example, computer readable signal media 226 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 218 may be downloaded over a network to persistent storage 208 from another device or data processing system through computer readable signal media 226 for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different advantageous embodiments may be implemented in a data processing system including components in addition to or in place of those illustrated for data processing system 200. Other components shown in FIG. 2 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 204 may take the form of a hardware unit that has circuits that are manufactured or configured for a particular use. This type of hardware may perform operations without needing program code to be loaded into a memory from a storage device to be configured to perform the operations.

For example, when processor unit 204 takes the form of a hardware unit, processor unit 204 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 218 may be omitted because the processes for the different embodiments are implemented in a hardware unit.

In still another illustrative example, processor unit 204 may be implemented using a combination of processors found in computers and hardware units. Processor unit 204 may have a number of hardware units and a number of processors that are configured to run program code 218. With this depicted example, some of the processes may be implemented in the number of hardware units, while other processes may be implemented in the number of processors.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206, or a cache, such as found in an interface and memory controller hub that may be present in communications fabric 202.

The illustration of data processing system 200 in FIG. 2 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in addition to use with application-specific integrated circuit (ASIC) CPUs, complex instruction set computing (CISC), reduced instruction set computers (RISCs), and transport triggered architecture (TTA) CPUs, the different advantageous embodiments may be implemented with application-specific instruction-set processors (ASIPs), among other possible preferred implementations.

As used herein, the phrase "at least one of", when used with a list of items, means that different combinations of one or more of the items may be used and only one of each item in the list may be needed. For example, "at least one of item A, item B, and item C" may include, for example, without limitation, item A or item A and item B. This example also may include item A, item B, and item C or item B and item C.

As used herein, when a first component is connected to a second component, the first component may be connected to the second component without any additional components. The first component also may be connected to the second component by one or more other components. For example, one electronic device may be connected to another electronic device without any additional electronic devices between the first electronic device and the second electronic device. In some cases, another electronic device may be present between the two electronic devices connected to each other.

The different advantageous embodiments recognize and take into account that current systems rely on compilers to expand pseudo operations into sequences or call subroutines, which is often a multiple cycle operation in and of itself. Some current methods have the compiler expand a single macro instruction to a sequence of instructions, which is an inefficient use of program space.

Thus, the different advantageous embodiments provide a apparatus comprising a central processing unit, a microcode store, and a number of functional units. The central processing unit utilizes transport triggered architecture and is configured to execute microcoded instructions that allow a single instruction to be executed as multiple instructions. The microcode store includes a number of microcoded instructions. The number of functional units includes a number of useful entry points into the microcode store.

The different advantageous embodiments further provide a method for using microcoded instructions in a transport triggered architecture central processing unit. A microcoded instruction is loaded from a program. A useful entry point address of a microcoded instruction implementation in a microcode store is transferred to a program counter of a central processing unit. The microcoded instruction implementation is loaded from the microcode store using the useful entry point address. A determination is made as to whether the instruction type of the microcoded instruction implementation loaded from the microcode store is a return, non-microcoded, or microcoded type instruction.

The different advantageous embodiments further provide a reconfigurable system in a transport triggered architecture comprising an integrated nonvolatile microcode store, a number of functional modules, and a control module. The integrated nonvolatile microcode store includes a number of microcoded instruction implementations. The number of functional modules provides a number of useful entry points into the microcode store and further comprise a program counter. The control module is configured to load the number of microcoded instruction implementations from the integrated nonvolatile microcode store into the program counter of the number of functional modules.

Figure 3:
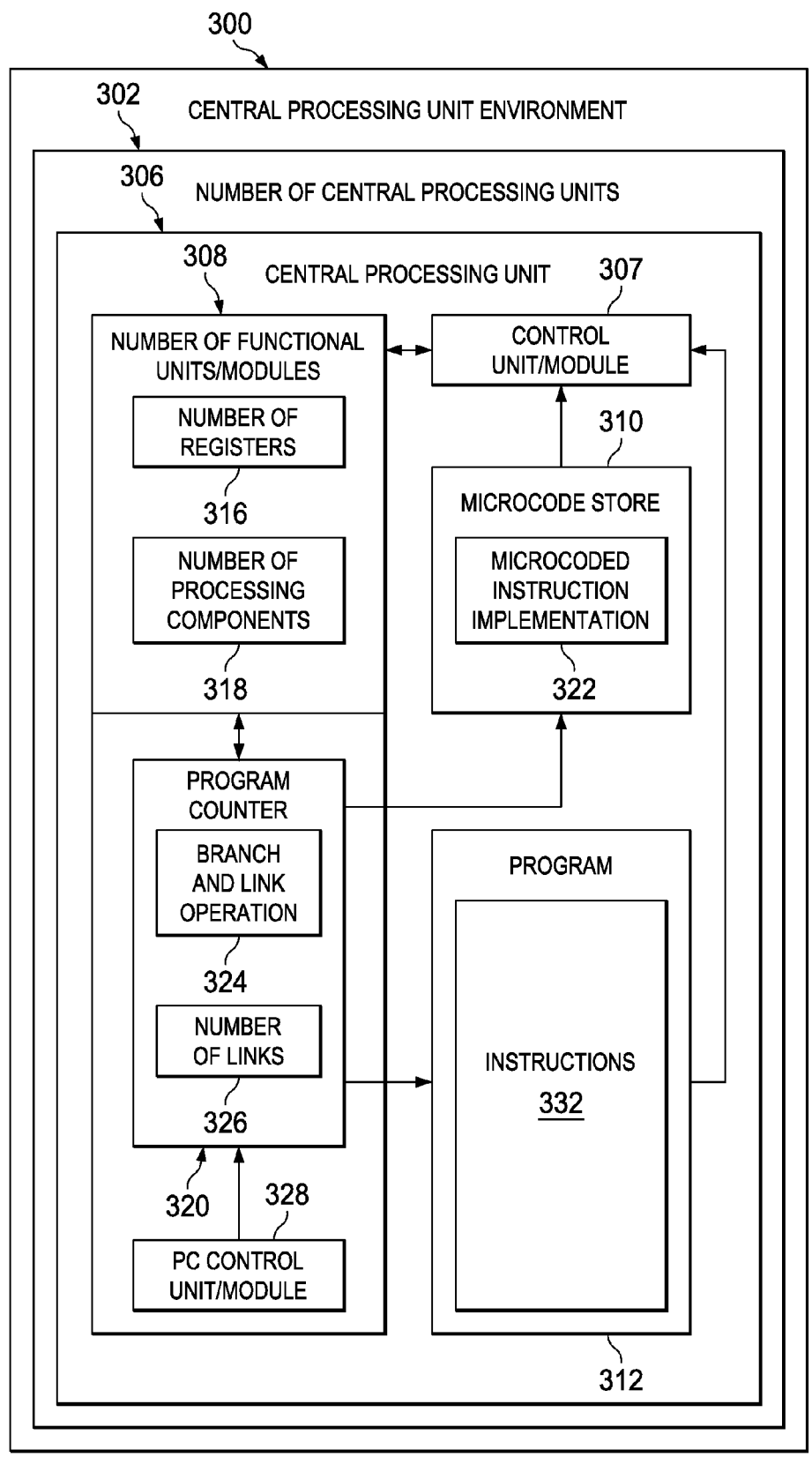
FIG. 3 is an illustration of a central processing unit environment in accordance with an advantageous embodiment.

With reference now to FIG. 3, an illustration of a central processing unit environment is depicted in accordance with an advantageous embodiment. Central processing unit environment 300 may be implemented in a network environment, such as network data processing system 100 in FIG. 1, for example.

Central processing unit environment 300 includes number of central processing units 302 employing transport triggered architecture. Central processing unit (CPU) 306 is an illustrative example of one implementation of number of central processing units 302. CPU 306 employs transport triggered architecture via control unit/module 307 in this example.

CPU 306 includes number of functional units/modules 308, microcode store 310, and program 312. Number of functional units/modules 308 performs the operations and calculations called for by program 312 in CPU 306, for example. Number of functional units/modules 308 may include number of registers 316, number of processing components 318, and program counter 320.

Number of registers 316 is a small amount of storage available on CPU 306, the contents of which can be accessed more quickly than storage available elsewhere. In an illustrative example, data may be loaded from some larger memory, such as memory 206 in FIG. 2, into number of registers 316. The data loaded into number of registers 316 in this illustrative example may then be manipulated or tested using machine instructions before being stored back into memory, potentially at some different location than the location from which the data was retrieved. Number of registers 316 may provide the fastest option for CPU 306 to access data, in one advantageous embodiment.

Number of processing components 318 may be a number of units that perform basic operations for Number of functional units/modules 308. Basic operations may include, for example, without limitation, addition, subtraction, bit shifting, and the like.

Program counter 320 is a type of functional unit in number of functional units/modules 308. Program counter 320 is a process register that indicates where the computer is in its instruction sequence. Program counter 320 may either hold the address of the instruction being executed or the address of the next instruction to be executed, for example. Program counter 320 may also be referred to as an instruction pointer, in some illustrative examples. Program counter 320 may fetch a program instruction, such as instructions 332 from program 312, for example. Program counter 320 may be incremented automatically after fetching program instructions so that instructions are normally retrieved sequentially from memory with certain exceptions, such as branches, jumps, subroutine calls, and returns.

In this illustrative example, program counter 320 includes branch and link operation 324. Branch and link operation 324 may be a branch instruction, where the flow of control is altered at a specific point in a computer program but a link to the original control flow is retained in a special register, stack, or other memory area. An instruction that causes branch and link operation 324 may either be taken or not taken. If a branch is not taken, the flow of control is unchanged and the next instruction to be executed is the instruction immediately following the current instruction in memory. If the branch is taken, the next instruction to be executed is an instruction at some other place in memory and the original control location is saved for later use.

Microcode store 310 is an integral nonvolatile microcode store that contains useful sequences of instructions that comprise the desired microcoded instructions mapped into the executable memory map of CPU 306. Microcode store 310 may be, for example, without limitation, a mask random access memory (ROM) or flash memory device. One or more of number of functional units/modules 308 may be introduced that return useful entry points into microcode store 310, for example. Useful entry points are the start of an instruction within a microcode store, for example. In other words, microcode store 310 may be, for example, 256 words. Starting at zero might be a multiply instruction, while starting at word twenty-eight might be a divide instruction. Thus, zero and twenty-eight may be useful entry points, in this illustrative example. Further, starting at word eighty might be a decimal adjust instruction, in this illustrative example. Starting at location four may be allowed, but not a useful entry point, because it is the middle of the multiply routine starting at word zero, in this example. By transferring these predefined, or useful, entry points into program counter 320, CPU 306 is induced to perform a sequence equivalent to a subroutine call into microcode store 310. This equivalent subroutine call results in the execution of a microcoded instruction composed of multiple other instructions. The instruction implementations from microcode store 310 are performed in sequence by CPU 306 essentially converting what appears to be a single instruction into an effective subroutine call within microcode store 310.

In an illustrative example, number of functional units/modules 308 may include thirty-two registers and PC control unit/module 328. PC control unit/module 328 that causes CPU 306 to execute subroutines. It may be desirable to add a multi-cycle multiply instruction to CPU 306, in this illustrative example. The register bank, represented by number of registers 316, may be increased by one so that there is now a read-only register thirty-three that always returns a selected entry point into microcode store 310, in one advantageous embodiment. Microcode store 310 may then be introduced with instructions needed to perform the multiplication. In this example, an instruction to multiply may be: MOV R(33), PC_CALL. If desired, an assembler may be modified to recognize an instruction, such as multiply (MULT), and generate the appropriate bit pattern, for example. Unlike other assembler alias schemes, however, the new multiply instruction is not composed of a series of instructions inserted into the user's program or an arbitrary subroutine. It appears to be a native, albeit, multicycle, instruction. This is not only a useful abstraction for the programmer, but also allows other implementations of the CPU to implement the multiply instruction as a true native instruction without affecting existing software.

An assembler is a component that creates object code by translating assembly instruction mnemonics into binary machine code and resolving symbolic names for memory location and other entities.

CPU 306 will nominally fetch instructions from instructions 332. The instructions fetched may be microcoded or non-microcoded. Normal, or non-microcoded, instructions direct control unit 307 to transfer data from one functional unit in number of functional units/modules 308 to another functional unit within number of functional units/modules 308, for example. This transfer of data is the basic operation of any transport triggered processor. However, as in any transport triggered processor, this transfer may have side effects, such as causing an arithmetic operation, an input/output operation, or other processing as directed by one or more of the specific processing components in number of processing components 318.

Instructions 332 of program 312 may also contain one or more microcoded instructions. A microcoded instruction appears to be a single instruction to a programmer and/or processor that control unit/module 307 interprets as two or more instructions while retaining the appearance of a single instruction to program 312. The implementation of the microcoded instructions has several options. In one illustrative example, a special functional unit may hold an entry point into microcode store 310 and the instruction transfers from this functional unit to the functional unit that controls program counter 320 of CPU 306. In another illustrative example, the source of the entry point may be replaced with a special microcode register and transfer occurs to program counter 320. In either case, the transfer to the program counter 320 must also cause the program counter to save the return address as in a subroutine call, such as branch and link operation 324, for example. The storage, or subroutine call stack, may be illustrated by number of links 326.

CPU 306 then executes a first instruction from microcoded instruction implementation 322, and then a second instruction from microcoded instruction implementation 322, along with any subsequent instructions contained in microcoded instruction implementation 322. Microcode instruction implementation 322 may be a sequence of non-microcoded instructions and/or may include further microcoded instructions if the method used to save the return address allows multiple entries, such as, for example, a call stack. A special return instruction, such as a normal subroutine return instruction, for example, causes program 312 to resume unaware that the instruction required multiple operations, in this illustrative example.

The illustration of central processing unit environment 300 in FIG. 3 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 4:
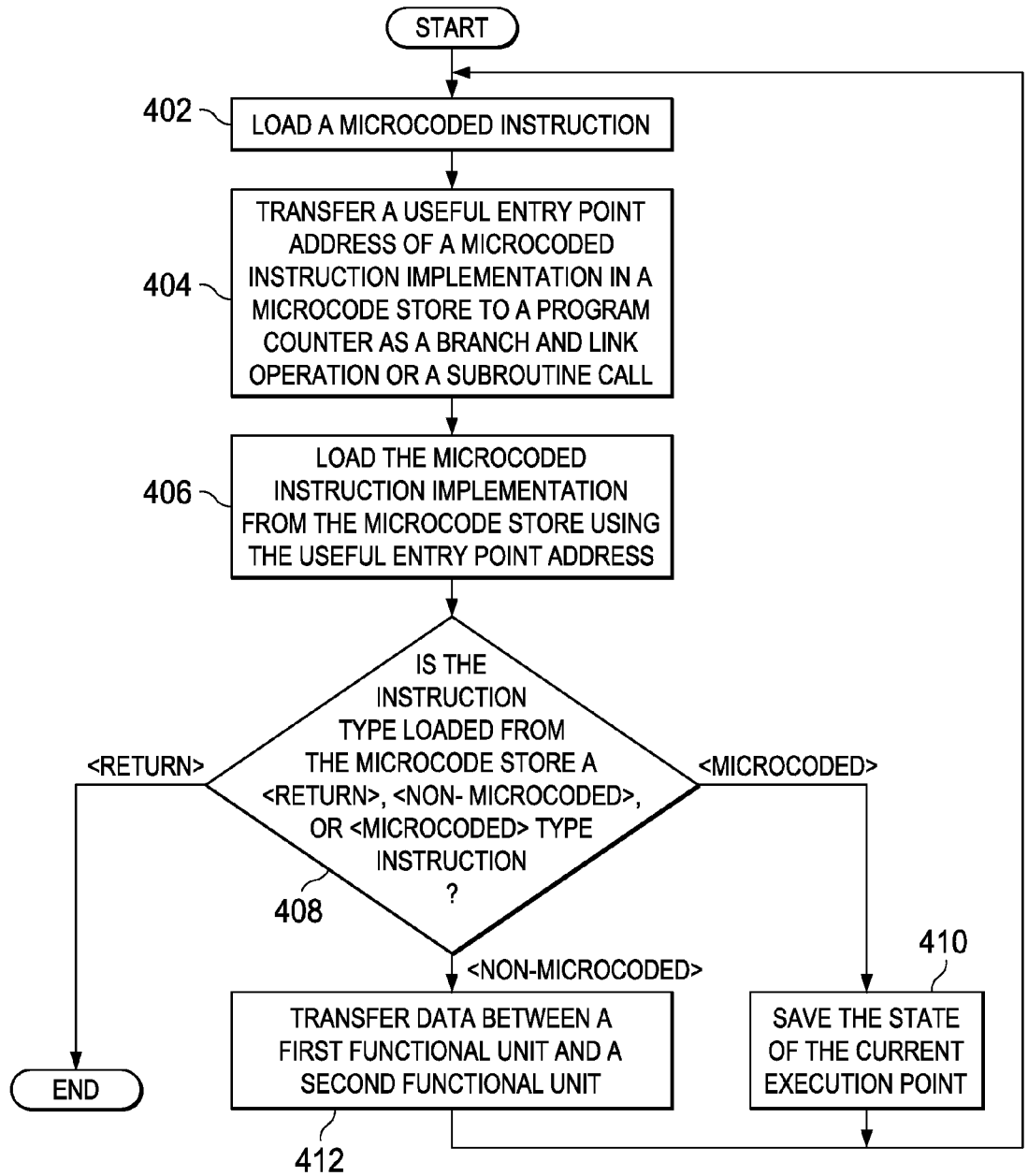
FIG. 4 is an illustration of a flowchart for a process of using microcode for transport triggered architecture central processing units in accordance with an advantageous embodiment.

With reference now to FIG. 4, an illustration of a flowchart for a process of using microcode for transport triggered architecture central processing units is depicted in accordance with an advantageous embodiment. The process in FIG. 4 may be implemented by a component such as central processing unit 306 in FIG. 3, for example.

When a central processing unit executes a microcoded instruction, it executes the process, which begins by loading a microcoded instruction (operation 402). The control unit of a central processing unit, such as control unit/module 307 in FIG. 3, will load the microcoded instruction from a program, such as program 312, for example. The microcoded instruction may be, for example, instructions 332 in FIG. 3 executed by program 312. The process transfers a useful entry point address of a microcoded instruction implementation in a microcode store to a program counter as a branch and link operation or a subroutine call (operation 404). The microcoded instruction implementation may be, for example, microcoded instruction implementation 322 in microcode store 310 in FIG. 3.

The process loads the microcoded instruction implementation from the microcode store using the useful entry point address (operation 406). The control unit of the central processing unit is responsible for loading the microcoded instruction implementation from the microcode store, in this example. The process then determines whether the instruction type loaded from the microcode store is a <return>, <non-microcoded>, or <microcoded>type instruction (operation 408).

If a determination is made that the instruction type is a <microcoded> type instruction, the process saves the state of the current execution point (operation 410), and returns to operation 402 in a recursive fashion, using the branch and link operation to remember the current position in the microcode instruction implementation before executing a new microcoded instruction. If a determination is made that the instruction type is a <non-microcoded> type instruction, the process transfers data between a first functional unit and a second functional unit (operation 412), and then returns to operation 402 to execute the next instruction in the microcoded instruction implementation. In this case, however, the branch and link mechanism is not used. The process simply loads the next instruction in the implementation, as a jump rather than a recursion, for example. If a determination is made that the instruction type is a <return> type instruction, the process terminates thereafter, restoring the most recent link saved by the branch and link mechanism.

The illustration of the process in FIG. 4 is not meant to imply physical or architectural limitations to the manner in which different advantageous embodiments may be implemented. Other steps in addition and/or in place of the ones illustrated may be used. Some steps may be unnecessary in some advantageous embodiments. Also, the operations are presented to illustrate some steps of some functional components. One or more of these operations may be combined and/or divided into different operations when implemented in different advantageous embodiments.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W) and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
a microcode store having a microcoded instruction implementation;
a central processing unit in communication with the microcode store, the central processing unit utilizing transport triggered architecture and configured to execute microcoded instructions that allow a single instruction to be implemented as multiple instructions;
a control unit configured to load the microcoded instruction implementation from the microcode store using a number of useful entry points in the microcoded instruction implementation;
a program counter of the central processing unit, the program counter configured to receive the number of useful entry points from the control unit to induce the central processing unit to perform a sequence equivalent to a subroutine call into the microcode store;
the control unit being further configured to determine whether the microcoded instruction implementation is a microcoded type instruction and, responsive to a determination that the microcoded instruction implementation is the microcoded type instruction, use a branch and link operation to save a state of a current execution point in the microcode instruction implementation, wherein the control unit is further configured to repeat loading the microcoded instruction implementation after using the branch and link operation, and the program counter is further configured to repeat receiving the number of useful entry points after the branch and link operation; and
the control unit being further configured to, responsive to a determination that the microcoded instruction implementation is a non-microcoded type instruction, transfer data between a first functional unit and a second functional unit without using the branch and link mechanism, and wherein the control unit is further configured to load a next instruction in the microcoded instruction implementation after transferring the data.

2. The apparatus of claim 1, wherein the program counter comprises a functional unit of the central processing unit.

3. The apparatus of claim 2, wherein the program counter includes a mechanism to execute subroutine calls.

4. The apparatus of claim 1, wherein the central processing unit further comprises a plurality of functional units, the plurality of functional units including a number of registers and a number of processing components.

5. The apparatus of claim 1, wherein the microcode store includes useful sequences of instructions mapped into the executable memory map of the central processing unit.

6. The apparatus of claim 1, wherein the microcoded instruction implementations include a plurality of instructions.

7. The apparatus of claim 1, wherein the microcoded instructions appear as a single instruction to a program.

8. The apparatus of claim 1, wherein the control unit is further configured to load a microcoded instruction from a program.

9. A method for using microcoded instructions in a transport triggered architecture central processing unit, the method comprising:
loading a microcoded instruction from a program;
transferring a useful entry point address of a microcoded instruction implementation in a microcode store to a program counter of a central processing unit;
loading the microcoded instruction implementation from the microcode store using the useful entry point address;
determining whether the instruction type of the microcoded instruction implementation loaded from the microcode store is at least one of a return, non-microcoded, and microcoded type instruction;
responsive to a determination that the instruction is a microcoded type instruction, using a branch and link operation to save the state of a current execution point and repeating loading, transferring, and determining; and responsive to a determination that the instruction is a non-microcoded type instruction, transferring data between a first functional unit and a second functional unit without using branch and link mechanism; and repeating loading, transferring, and determining.

10. The method of claim 9, wherein the microcoded instruction implementation is one of a number of microcoded instruction implementations stored in a microcode store.

11. The method of claim 9, wherein the transfer of the useful entry point address of the microcoded instruction implementation is a branch and link operation.

12. The method of claim 9, wherein the transfer of the useful entry point address of the microcoded instruction implementation is a subroutine call.

13. The method of claim 9, wherein the central processing unit further comprises a control unit configured to load the microcoded instruction from the program.

14. A reconfigurable system in a transport triggered architecture, the system comprising:
   an integrated nonvolatile microcode store having microcoded instruction implementation;
   a number of functional modules providing a number of useful entry points into the microcode store and further comprising a program counter;
   a control module configured to load the number of useful entry points into the program counter of the number of functional modules;

the control module being further configured to determine whether the microcoded instruction implementation is a microcoded type instruction and, responsive to a determination that the microcoded instruction implementation is the microcoded type instruction, use a branch and link operation to save a state of a current execution point in the microcode instruction implementation, wherein the control unit is further configured to repeat loading the microcoded instruction implementation after using the branch and link operation, and the program counter is further configured to repeat receiving the number of useful entry points after the branch and link operation; and the control unit being further configured to, responsive to a determination that the microcoded instruction implementation is a non-microcoded type instruction, transfer data between a first functional unit and a second functional unit without using the branch and link mechanism, and wherein the control unit is further configured to load a next instruction in the microcoded instruction implementation after transferring the data.

15. The system of claim 14, wherein the control module is further configured to load microcoded instructions from a program into the program counter.

16. The system of claim 14, wherein the microcoded instruction implementation includes a plurality of instructions.

17. The system of claim 15, wherein the microcoded instructions appear as a single instruction to the program.

* * * * *